J. FROEHLICH.
ENVELOP MACHINE.
APPLICATION FILED JAN. 22, 1909.

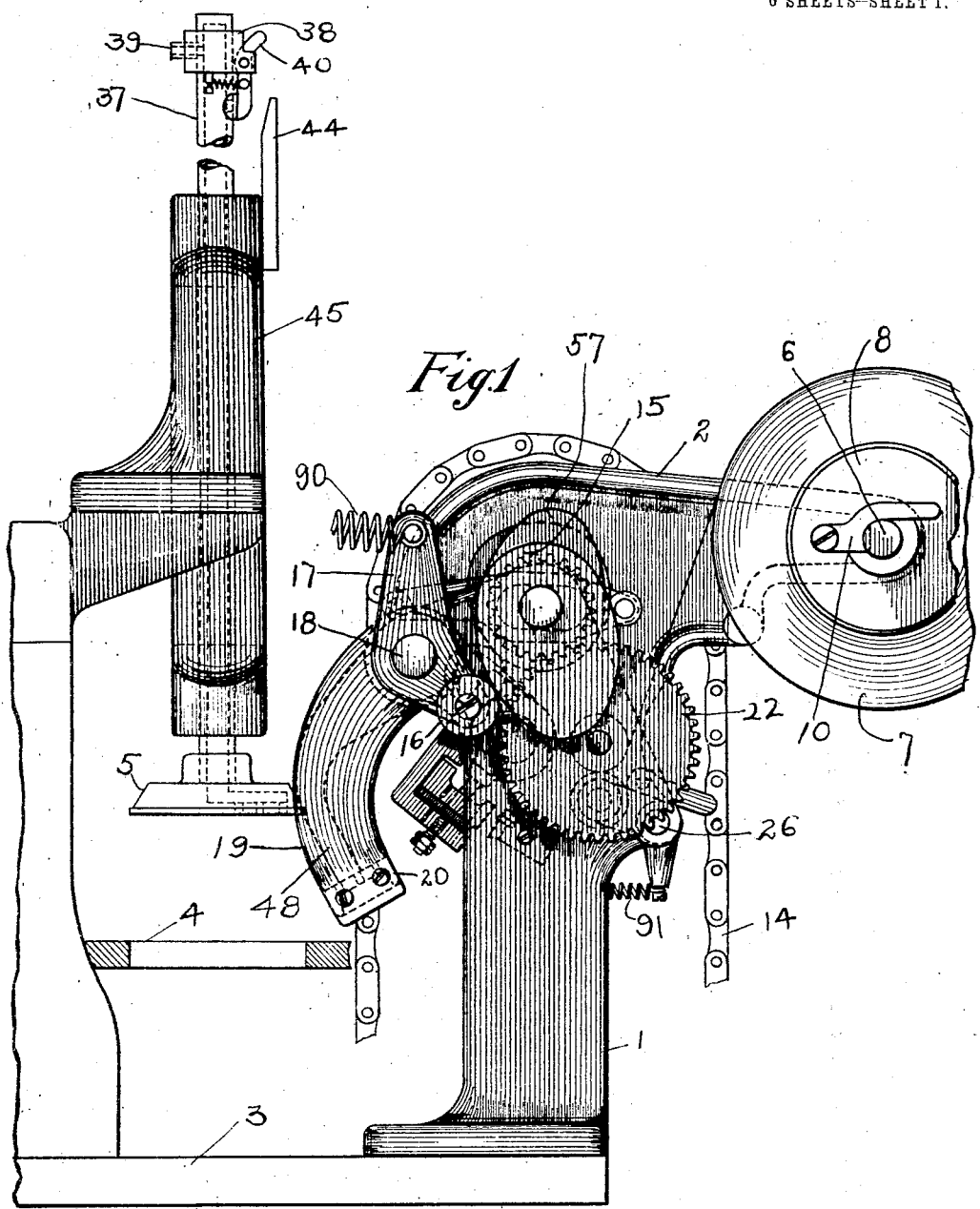

1,108,734.

Patented Aug. 25, 1914.
6 SHEETS—SHEET 2.

WITNESSES:
Abr. Novick.
Wm. F. Sjoberg

INVENTOR
Joseph Froehlich
BY
George Finkelstein
ATTORNEY.

J. FROEHLICH.
ENVELOP MACHINE.
APPLICATION FILED JAN. 22, 1909.

1,108,734.

Patented Aug. 25, 1914.
6 SHEETS—SHEET 3.

WITNESSES:
Abr Novick
Wm F. Sjoberg

INVENTOR
Joseph Froehlich
BY George Finkelstein
ATTORNEY

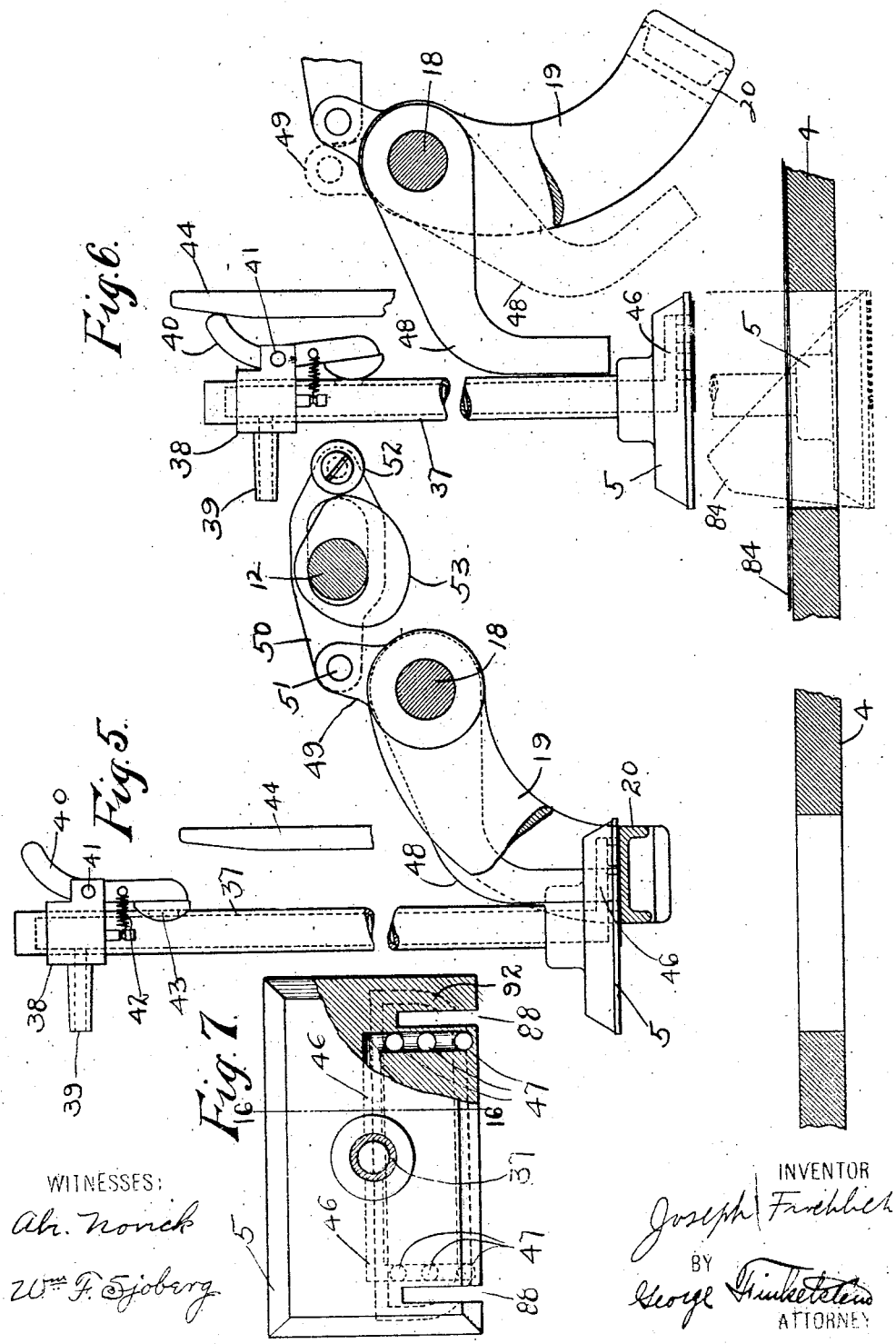

J. FROEHLICH.
ENVELOP MACHINE.
APPLICATION FILED JAN. 22, 1909.
1,108,734.
Patented Aug. 25, 1914
6 SHEETS—SHEET 5.
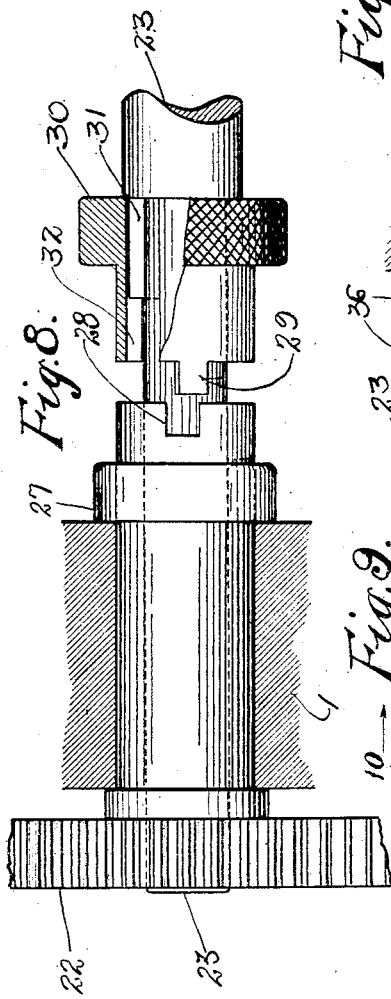
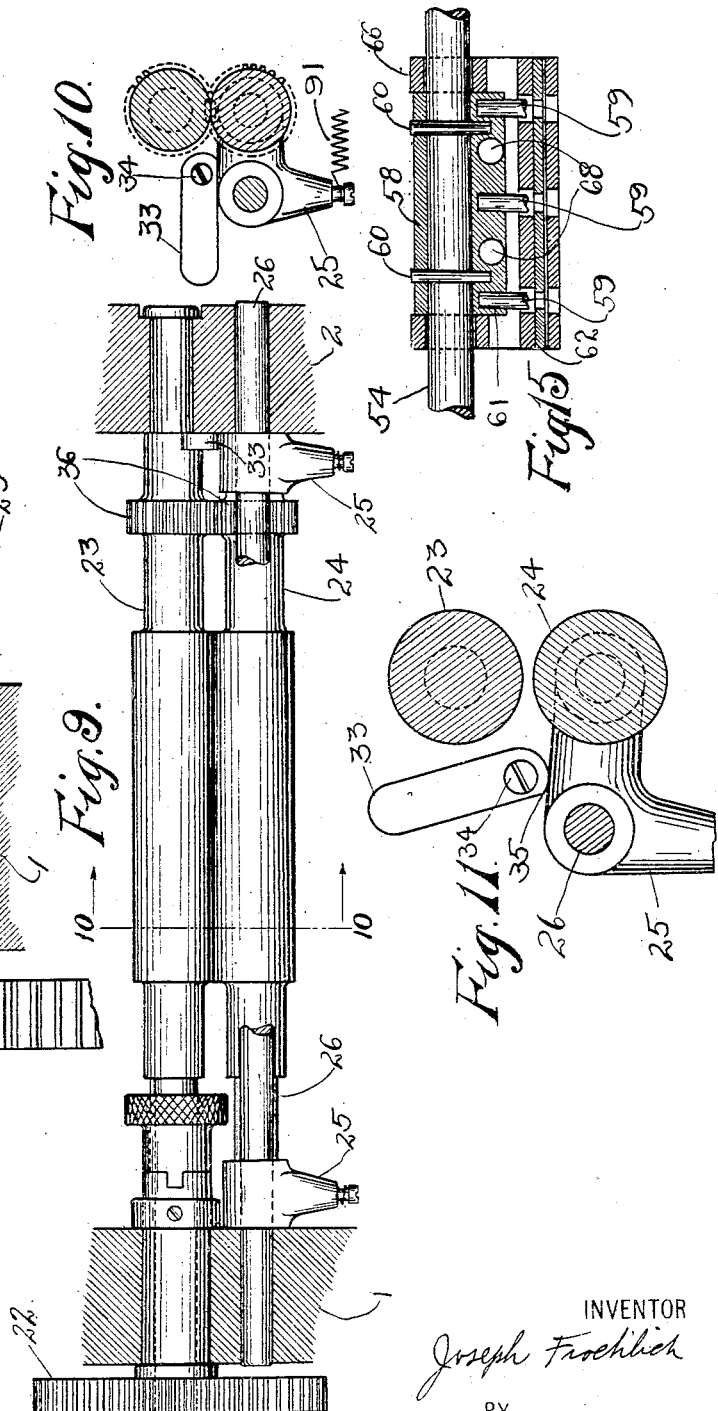
WITNESSES:
Abr. Novick
Wm F. Sjoberg
INVENTOR
Joseph Froehlich
BY
George Finkelstein
ATTORNEY

J. FROEHLICH.
ENVELOP MACHINE.
APPLICATION FILED JAN. 22, 1909.

1,108,734.  
Patented Aug. 25, 1914.  
6 SHEETS—SHEET 6.

WITNESSES:
Abr. Novick.
Wm. F. Sjoberg.

INVENTOR
Joseph Froehlich
BY
George Finkelstein
ATTORNEY

UNITED STATES PATENT OFFICE.

JOSEPH FROEHLICH, OF NEW YORK, N. Y., ASSIGNOR, BY MESNE ASSIGNMENTS, TO UNITED STATES ENVELOPE COMPANY, OF SPRINGFIELD, MASSACHUSETTS, A CORPORATION OF MAINE.

ENVELOP-MACHINE.

1,108,734.

Specification of Letters Patent. Patented Aug. 25, 1914.

Application filed January 22, 1909. Serial No. 473,621.

*To all whom it may concern:*

Be it known that I, JOSEPH FROEHLICH, a citizen of the United States, residing in the borough of Brooklyn, Kings county, city and State of New York, have invented certain new and useful Improvements in Envelop-Machines, of which the following is a specification.

My invention relates to a mechanism, which can be attached to the ordinary type of reciprocating envelop machines, so that by means of my mechanism it will be possible to make on envelop machines of the reciprocating type the standard commercial envelops now made, and also envelops known as open window or transparent envelops, that is envelops, having an opening in the portion of the envelop occupied by the address, this opening being covered by a transparent sheet of paper, so that the inclosure in the envelop, will disclose the address, suitably written upon it, through this transparent covering.

Figure 3:
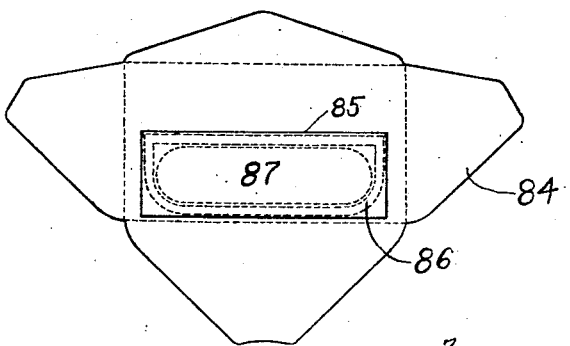
Figure 2:
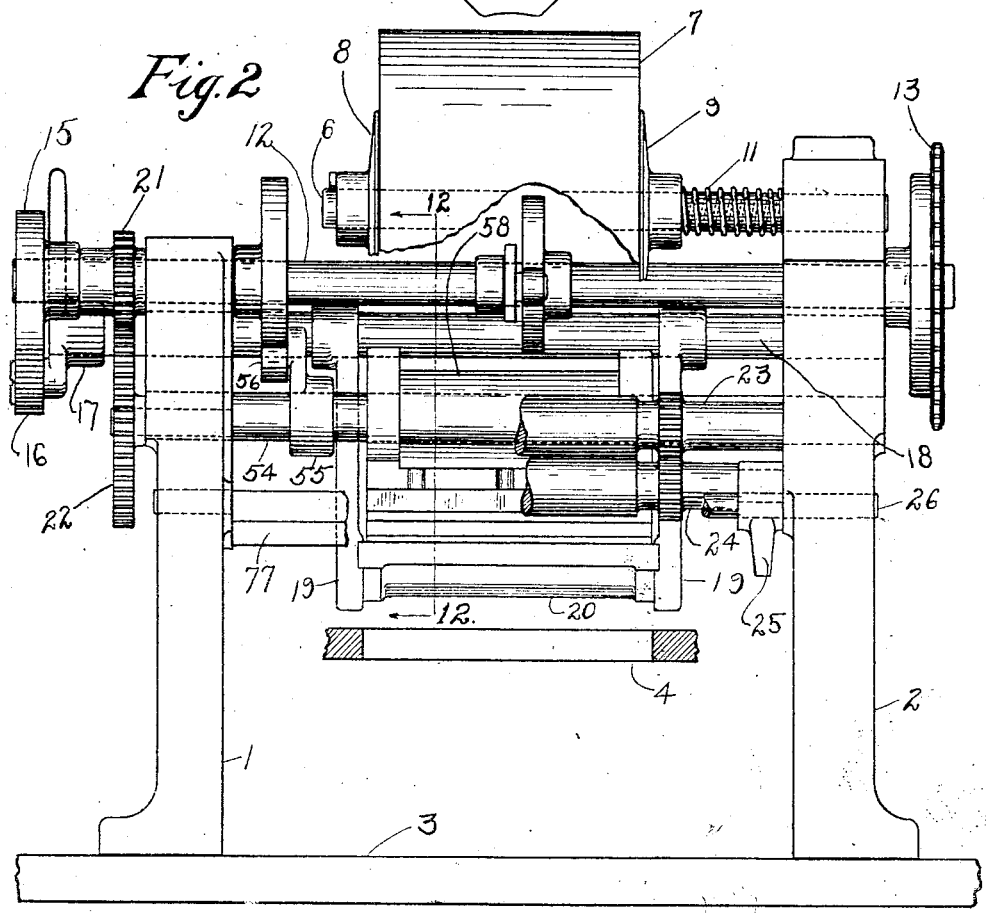
Figure 4:
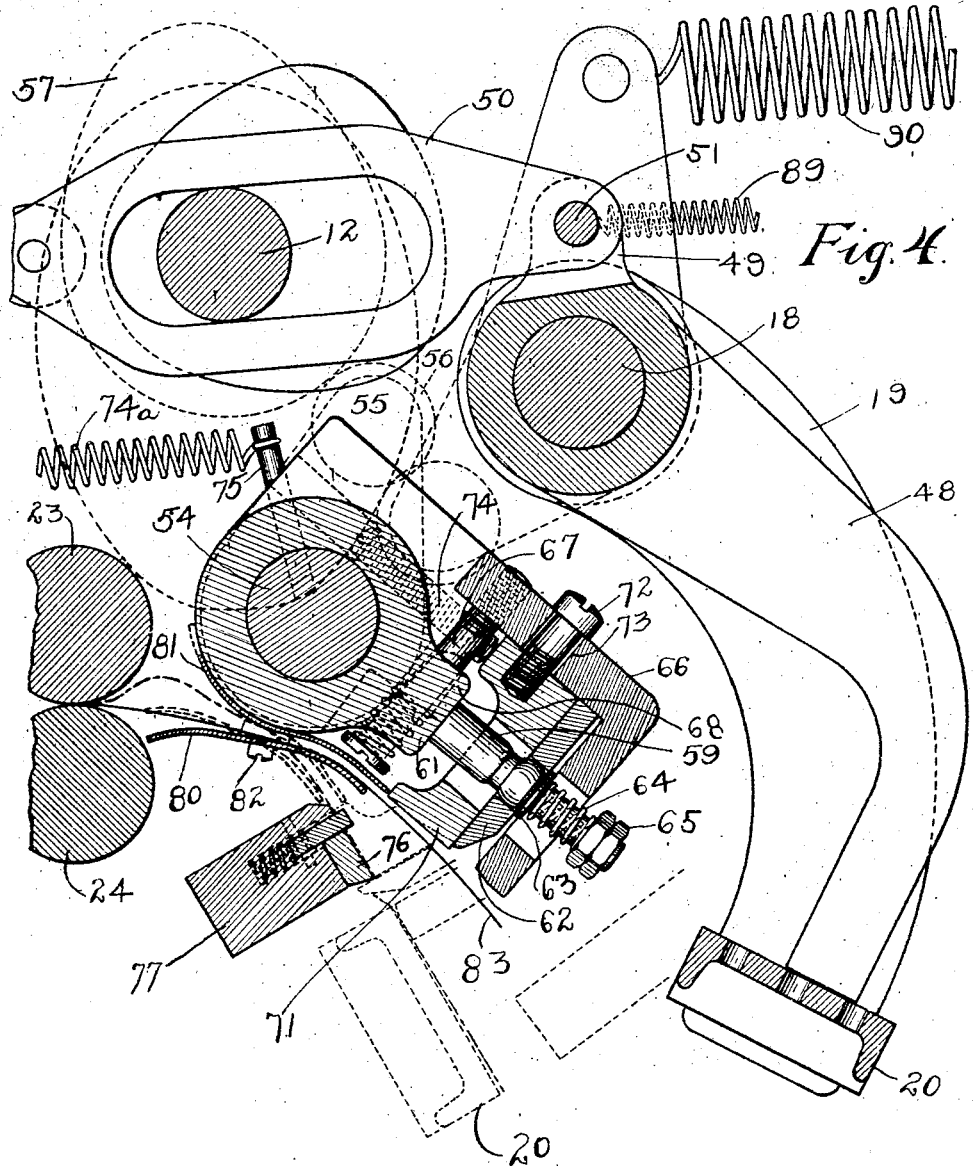
Figure 16:
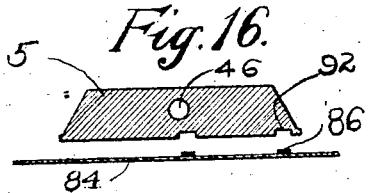
Figure 12:
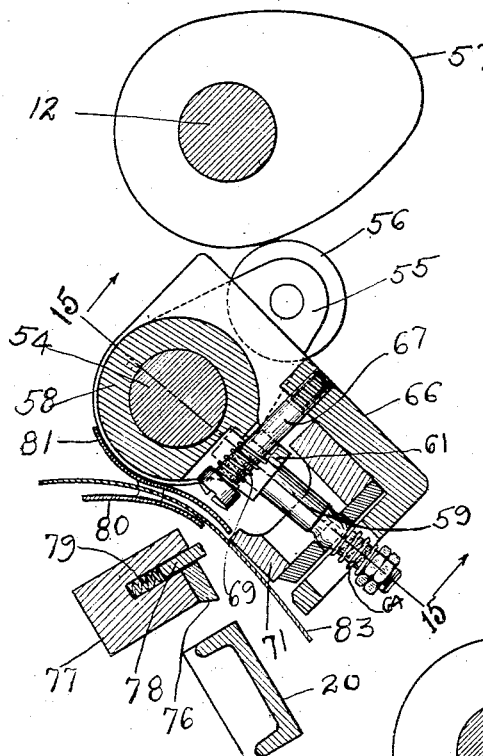
Figure 13:
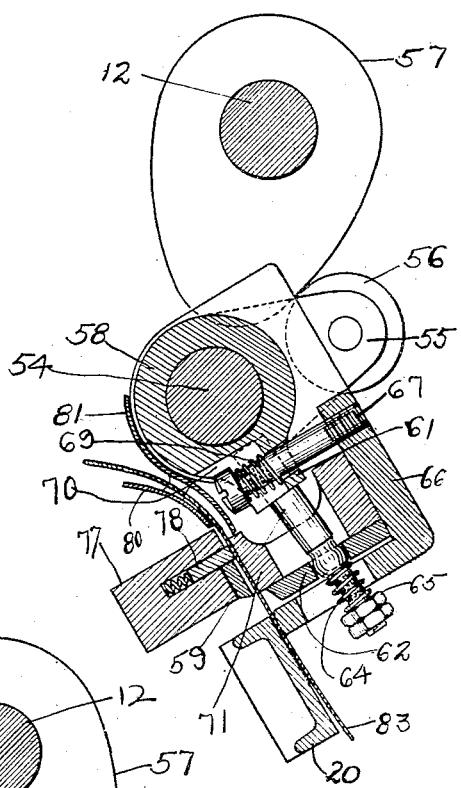
Figure 14:
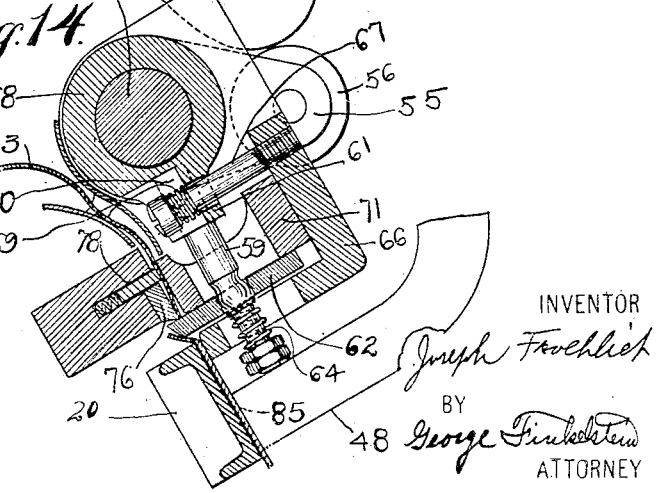

In the drawings accompanying and forming part of this specification, Figure 1 is a side elevation of the mechanism, showing its relation to the plunger and creasing table of an ordinary envelop machine. Fig. 2 is a rear elevation with certain parts broken away. Fig. 3 is a view showing an envelop blank with the piece of transparent paper attached thereto. Fig. 4 is an enlarged sectional view taken on the line 12—12 of Fig. 2. Figs. 5 and 6 are views showing the transparent paper conveyer in various positions in relation to the plunger plate, a plan view of which is shown in Fig. 7. Fig. 8 is a detailed view showing the clutch on the upper feed roll shaft. Fig. 9 is a view showing the two feed rolls. Fig. 10 is a sectional view taken on the line 10—10 of Fig. 9 and looking in the direction indicated by the arrow. Fig. 11 is another view similar to Fig. 10, showing the feed rolls separated. Figs. 12, 13, and 14 are sectional views taken on the line 12—12 of Fig. 2 showing different positions of the cutting mechanism. Fig. 15 is a sectional view taken on the line 15—15 of Fig. 12. Fig. 16 is a section taken on the line 16—16 of Fig. 7.

In detail, 1 and 2 represent the left and right hand side frames of my mechanism. These side frames are suitably mounted upon the table 3 of an ordinary envelop machine. The right hand side frame 2 is extended in its upper right hand end (see Fig. 1) for the purpose of carrying a spindle or shaft 6 upon which the roll of transparent paper 7 is mounted. This roll is held in position by the flange 8 on one side and by the flange 9 on the other side. Flange 8 is held in position on the shaft 6 by the locking piece 10, which fits into a groove at the end of the shaft 6 and is held in position against the roll of paper 7 by the spring 11 which encircles the shaft 6 between the flange 9 and the side frame 2 (see Fig. 2).

12 is a continuously revolving shaft having its bearings in the upper end of the side frames 1 and 2. Mounted on the right hand end of this shaft is a sprocket wheel 13 over which a chain 14 runs, which is utilized for the purpose of driving my mechanism.

15 is a cam mounted on the left hand end of the shaft 12 and is for the purpose of engaging the cam roll 16 mounted on lever 17, which in turn is secured to a rock shaft 18, that carries two arms 19. The lower end of the aforesaid arms 19 are joined by the transparent paper conveyer 20 (see Figs. 1, 2 and 4). 21 is a pinion secured to shaft 12, which meshes into the gear 22, which in turn is mounted on a sleeve 27 (see Fig. 8).

24 is the lower feeding roll, which revolves in arms 25, which in turn are secured to a rock shaft 26, which has its bearings in the side frames 1 and 2. Two springs 91 are mounted on the lower end of arms 25 for the purpose of swinging the lower feed roll 24 against the upper feed roll 23 (see Figs. 8, 9, 10 and 11). The right hand end of the sleeve 27 has a notch 28 for the purpose of engaging with the tongue 29 of the clutch 30 when the same is moved over to its extreme position toward the left. 31 is a key secured to the feed roll 23 and moves freely in the keyway 32 of the clutch 30. (See Fig. 8.)

The gear 22 and the sleeve 27 revolve continuously and when the clutch is moved over toward the left, the tongue 29 engages the notch 28 of the sleeve 27, and the revolving motion of the sleeve 27 is thereby transmitted to the feed roll 23. The object of the clutch 30 is to disengage the feed rolls 23 and 24, so that by means of the knurling on clutch 30, the feed rolls 23 and 24 can be revolved by hand. (See Figs. 8 and 9.)

33 is a short lever mounted on a stud 34

(see Figs. 10 and 11), having at its end a cam shaped projection 35 acting on one of the arms 25, and is for the purpose of separating the two feed rolls, for the more ready insertion of the transparent web of paper, when it is moved into the position shown in Fig. 11. The revolving motion of the feed roll 23 is transmitted to the feed roll 24 by the gears 36.

Referring to Figs. 1, 5, 6 and 7, 5 is a specially constructed plunger plate mounted on the lower end of a tube 37, on whose upper end is mounted a block 38, having a nipple 39, which is connected by means of a suitable rubber hose to a suction pump (not shown). 40 is a release valve lever swinging on a pivot 41, which is secured to the block 38. The lower end of this release valve lever 40 is for the purpose of covering an aperture 43 in the tube 37. 42 are springs, one end of which is secured to the release valve lever 40 and the other end secured to a stud which is part of the block 38. 44 is a stationary cam shaped piece secured to the upper end of a frame 45, guiding the tube and plunger plate 37 and 5 respectively (see Fig. 1).

Referring to Fig. 7, 46 are passages connecting with the tube 37. 47 are openings in the lower side of the plunger 5 and connecting with the passages 46. The lower end of the plunger plate contains a recess 92, which is for the purpose of clearing the gum strip 86 on the blank 84, when the plate comes in contact with same in the creasing box 4. This can be clearly seen in Figs. 7 and 16. This allows the gummed blank to be run through the machine without any chance of it being stuck to the under side of the plunger plate, which is a serious defect on all other known mechanisms which either apply the transparent sheet by means of a hopper in the plunger, or under pressure at a middle station table or table intervening between the gumming and plunger mechanisms of the envelop machine. 48 are two fingers mounted on a sleeve 49 which revolves freely on the rock shaft 18, and are connected to a link by means of the pin 51. This link 50 straddles the cam shaft 12 and has mounted on its other end a cam roll 52 which is engaged by the cam 53 secured to the shaft 12. (See Fig. 5.)

Referring to Fig. 2, 54 is a rock shaft carried at each end by the side frames 1 and 2. Securely mounted on the shaft 54 is an arm 55 having at its end a cam roll 56 which engages with a cam 57 on the shaft 12 (shown by dotted lines in Fig. 4). Secured to the shaft 54 by means of the pins 60, is a sleeve 58 having at its lower end an extension 61 into which are driven studs 59. (See Fig. 15.) As shown in Figs. 4, 12, 13 and 14 these studs 59 pass through the knife blade 62, through washer 63, springs 64 and have mounted on their lower ends the check nuts 65. 66 is a knife blade carrier, which is loosely mounted on the shaft 54. 67 are screws secured to the knife blade carrier 66. These screws project through openings 68 in the sleeve 58. 69 are coil springs mounted between the heads of the screws 67 and the shoulders of a recess 70 in the sleeve 58. 71 is a knife guide bar and is secured to the knife blade carrier 66 by means of the screws 72 which pass through slotted holes 73 in the knife blade carrier 66. 74 are adjusting screws acting against the knife guide bar 71. (See Fig. 4).

The normal position of the shaft 54, knife blade carrier 66 and sleeve 58 is shown in Figs. 4 and 12. This position is obtained by means of the springs 74ª connected with the stud 75, which is driven into the shaft 54. This position is controlled by the lower part of the cam 57, the cam roll 56 and the lever 55.

Referring again to Figs. 12, 13 and 14, 76 is a stationary knife mounted on a cross bar 77, which is supported by the side frames 1 and 2. 78 is an equalizing bar located in a slot running longitudinally in the bar 77. 79 are springs underneath the bar 78, having a tendency to keep the bar 78 in the position shown in Fig. 12. 80 and 81 are guide plates secured to the knife blade carrier 66 by means of the screws 82 and are somewhat separated in order to let the transparent strip 83 pass freely between them.

Fig. 3 shows an envelop blank 84 having the severed transparent strip 85 pasted over the opening 87 by means of the strip of gum 86 encircling the opening 87. The transparent paper is first passed between the rolls 23 and 24, said rolls continuously unwind the paper, while in operation. The transparent paper is then passed between the two guide plates 80 and 81. The circumference of the feed rolls are such that a suitable length of the transparent paper is fed for each revolution of the feed rolls. When the proper length of the strip 83 has been fed out, the cam 57 causes the knife blade carrier 66 to assume the position shown in Fig. 13. The transparent strip is now held between the knife guide bar 71 and the equalizing bar 78 and also between the knife blade carrier 66 and transparent paper conveyer 20. The spring 69 acting against the screw 67 keeps the knife blade carrier 66 against one side of the knife bar as shown in Figs. 12 and 13. When the cam 57 has moved into the position shown in Fig. 14, giving a still further rocking movement to the shaft 54, sleeve 58 and studs 59, the knife blade carrier 66 by being prevented from any further movement on account of coming in contact with the paper strip conveyer 20 and equalizing bar 78, causes the spring 69 to be compressed as shown in Fig. 14. The lower side of the knife bar 62 has passed beyond the sharp edge of the stationary knife 76 causing the strip of transparent paper to be severed from the web. The fingers 48 have assumed a position as shown in Fig. 14 and are now holding the severed strip securely to the transparent strip conveyer 20. The knife blade carrier 66 now returns to its normal position again, as indicated by Fig. 12. The conveyer 20 is now operated upon by means of the arms 19, rock shaft 18, lever 17, cam roll 16, cam 15, and swung into the position against the underside of the plunger plate as shown in Fig. 5. The fingers 48 are raised slightly by means of the cam 53 and are held in this position for a part of a revolution of the machine. A vacuum is formed as soon as the strip comes in contact with the underside of the plunger by covering the apertures 47. The conveyer 20 now returns to its normal position as indicated in Fig. 6 and by the dotted lines in Fig. 4. The plunger plate with the transparent paper strip underneath it now descends upon the envelop blank 84 causing same to be depressed through the creasing box 4 and thus placing the transparent paper over the strip of gum on the blank. Shortly before the plunger plate gets to its lowest position, the release valve lever 40 coming in contact with the stationary cam shaped piece 44 uncovers the aperture 43 in the tube 37, thus destroying the vacuum formed by the transparent strip as previously described. The plunger plate 5 now returns to its normal position as indicated in Fig. 5, ready to receive another strip. The notches 88 in the plunger plate 5 permit the fingers 48 to swing freely through it, as shown in Fig. 7. The spring 89 is for the purpose of keeping the fingers 48 in proper contact with the conveyer 20. The spring 90 is for the purpose of returning the conveyer 20 to its normal position. During the time that the transparent paper is held in the position as shown in Fig. 14, the feed rolls by revolving continuously, cause the transparent paper 83 to buckle as also indicated by the dot and dash lines in Fig. 4.

What I claim as my invention and desire to secure by Letters Patent is:

1. In an envelop machine, the combination with a creasing box to receive an envelop blank having an opening and a gummed strip around said opening, of a reciprocating plunger arranged to coöperate with said creasing box in folding an envelop blank, and having a recess corresponding with the gummed strip around said opening.

2. In an envelop machine, the combination with a creasing box to receive an envelop blank having an opening and a vertically reciprocating plunger arranged to coöperate with said creasing box in folding an envelop blank, of means for applying a single piece of paper to said plunger in its raised position over said creasing box and in registration with the opening in the envelop blank, and means for holding said piece of paper in contact with said plunger during its movement into said creasing box.

3. The combination with the folding mechanism of an envelop machine, comprising a vertically reciprocating plunger and means for holding a gummed envelop blank below said plunger and in registration therewith, of means for feeding a continuous strip of paper, means for severing a piece from said continuous strip arranged to be applied to said blank by the descent of said plunger, and means for receiving said severed piece and carrying it to the under side of said plunger when in its raised position.

4. The combination with the folding mechanism of an envelop machine, comprising a vertically reciprocating plunger and means for holding a gummed envelop blank below said plunger and in registration therewith, of means for feeding a continuous strip, a rocking arm at one end of its movement arranged to receive said strip, means for severing from said strip a piece held by said arm, and with said rocking arm at the other end of its movement arranged to convey said severed piece to the under side of said plunger when in its raised position.

5. The combination with the folding mechanism of an envelop machine, comprising a vertically reciprocating plunger and means for holding a gummed envelop blank below said plunger and in registration therewith, of means for feeding a continuous strip of paper, means for severing a piece from said continuous strip arranged to be applied to said blank by the descent of said plunger, means for receiving said severed piece and carrying it to the under side of said plunger when in its raised position, and means for holding said piece in contact with said under side during said descent.

6. The combination with the folding plunger and the creasing box of an ordinary envelop machine, means for unwinding a continuous strip of paper, a swinging conveyor arranged to receive the end of said paper as it is unwound, a cutting mechanism between said conveyer and said unwinding means arranged to sever a piece from the end of said continuous strip received by said conveyer suitable to be applied to an envelop blank on said creasing table, and means for swinging said conveyer from said first position to carry said severed piece to the under side of said plunger in its raised position.

7. The combination with the folding mechvertically reciprocating plunger and means for holding a gummed envelop blank below said plunger and in registration therewith, of a rock shaft, arms carried by said rock shaft and a paper conveyer on the lower end of said arms, yielding means for holding a piece of paper in contact with said conveyer, and means for operating said rock shaft, thereby swinging said conveyer to bring said piece of paper to the under side of said plunger in its raised position.

8. The combination with the folding mechanism of an envelop machine, comprising a vertically reciprocating plunger and means for holding a gummed envelop blank below said plunger and in registration therewith, of a paper conveyer for receiving a piece of paper designed to be brought into contact with said blank as said plunger descends, a rock shaft and means for supporting said conveyer from said shaft, a sleeve revolving on said shaft with fingers mounted thereon, with the lower end of said fingers held in yielding contact with said piece of paper on said conveyer, means for operating said rock shaft thereby swinging said conveyer to bring said piece of paper to the under side of said plunger when in its raised position, and means for raising the ends of said fingers when said piece of paper is brought into said contact.

JOSEPH FROEHLICH.

Witnesses:
F. L. SCHMIDT,
E. M. J. KUNZE.